United States Patent [19]
Rising

[11] Patent Number: 5,571,408
[45] Date of Patent: Nov. 5, 1996

[54] COMPOUND CLARIFICATION SYSTEM

[76] Inventor: William R. Rising, 221 Peachtree, Elk Grove Village, Ill. 60007

[21] Appl. No.: 426,025

[22] Filed: Apr. 21, 1995

[51] Int. Cl.$^6$ ................................................. B01D 35/06
[52] U.S. Cl. ...................... 210/167; 210/195.1; 210/223; 210/241; 210/257.1; 210/258; 210/259; 210/320
[58] Field of Search ...................................... 210/167, 171, 210/195.1, 222, 223, 241, 255, 257.1, 258, 259, 320, 521, 695, 416.1; 209/223.1, 478

[56] References Cited

U.S. PATENT DOCUMENTS

| | | | |
|---|---|---|---|
| 263,131 | 8/1882 | Edison | 210/222 |
| 1,390,688 | 9/1921 | Ellis | 210/695 |
| 2,582,401 | 1/1952 | Stinson | 210/255 |
| 3,725,262 | 4/1973 | Mattice et al. | 210/42 |
| 4,209,394 | 6/1980 | Kelland | 210/42 |
| 4,387,286 | 6/1983 | Inoue | 219/69 |
| 4,836,932 | 6/1989 | Walsh | 210/695 |
| 4,904,391 | 2/1990 | Freeman | 210/695 |
| 4,921,614 | 5/1990 | Frickman | 210/695 |

FOREIGN PATENT DOCUMENTS

| | | | |
|---|---|---|---|
| 1034306 | 7/1958 | Germany | 210/222 |
| 2914249 | 10/1980 | Germany | 210/241 |
| 29715 | 6/1965 | Japan | 210/695 |
| 37903 | 8/1986 | Japan | 209/223.1 |

*Primary Examiner*—Matthew O. Savage
*Attorney, Agent, or Firm*—Cummings & Lockwood

[57] ABSTRACT

A system for cleaning and recycling a deburring compound includes apparatus for removing both ferrous and non-ferrous solids from the fluid by providing an upwardly inclined filtering chute having a top surface on which the fluid is forced to flow upstream around a plurality of baffles for enhancing the settlement of solids from the fluid on the chute. The chute is also provided with a plurality of magnets on its bottom surface creating a magnetic field for enhancing the removal of ferrous solids from the fluid. The filtered fluid is further strained through a series of filter bags and a filter cartridge to remove any remaining solids and recycled. The chute is readily disassembled for easy cleaning to save down time.

11 Claims, 8 Drawing Sheets

COMPOUND CLARIFICATION SYSTEM

BACKGROUND OF THE INVENTION

1. Field of the Invention

This invention relates to a closed-loop filtration system for clarifying a deburring compound, and more particularly, a filtration system used in conjunction with vibratory deburring machines for cleaning, recirculating, and continuously recycling the deburring compound.

2. Description of the Prior Art

A deburring compound is a liquid agent, generally mixed with four or more parts water, which cleans metal parts as they are being deburred. The compound flushes the ground metal removed by the deburring media (evenly-formed ceramic shapes impregnated with aluminum oxide) to an exit drain. The compound also provides lubricity, and rust-inhibitive properties. Introduced by a spigot above the machine, the compound gathers dirt and ground metal removed from the parts, ground ceramic from the media, as well as aluminum oxide which has been freed by the grinding action of the tumbling mass, and then finds its way to the exit drain.

In ordinary deburring operations, this liquid is now usually considered spent. Some post-operations to the liquid may prolong its life by incorporating settling tanks, filter presses, and the like. These methods require much maintenance, and the savings are limited. They generally can only extend the life of the compound to about one week of use. Some users employ disposal companies to haul the liquid away for treatment. This represents a continuous, on-going expense, as just one vibratory deburring machine can produce from 400 to 2,000 gallons of liquid waste weekly. Some users with in-house treatment plants add chemicals to settle out the solids, after which the water may enter a sewer system. These common methods can be labor-intensive, expensive, and wasteful of natural resources. And all those methods fail to complete a closed-loop where the compound can be successfully re-introduced to the deburring machine, without loss or discharge to a receptacle such as a sewer.

Accordingly, it is the main object of this invention to decrease water and chemical consumption by the user by recycling a deburring compound without additional labor necessary as in other prior art methods.

SUMMARY OF THE INVENTION

In accordance with the present invention, a filter chute is situated below the exit drain of the deburring machine, and leads the liquid discharged to a first filter bag within a first tank. The main purpose of the filter chute is to collect as much as 80%–90% of the deburred solids before the compound reaches any of the disposable filters.

These solids are collected due in part to the incorporation of powerful ceramic magnets, located on the underside of the chute, to remove ground ferrous material from the solution. These magnets are approximately 1 inch thick by 4 inches wide and 6 inches long, and the number and pattern placements of the magnets vary according to the size of the deburring machine and/or the deburring application. The magnets are arranged on the underside of the chute and spaced with non-magnetic materials, such as wood or aluminum, in such a way as to maximize the polarity. Because of the size and power of the magnets used, the whole chute becomes saturated in its entirety by the magnetic force. It is this magnetic force field which attracts much of the ferrous material from the liquid discharge as it traverses the filter chute.

The filter chute is lower at the point where the liquid enters than it is where the liquid exits. In other words, the flow is directed uphill. The liquid is moved by displacement, and not by gravitational flow. The significance of this feature is that it greatly encourages settling. Due to this settling feature, whereas the ferrous particles are removed by the magnetic force, non-ferrous particles (such as copper, brass or aluminum) and non-metallic particles (such as ground ceramic media), can and do accumulate in the filter chute. By gathering so much of the solids in this manner before they have a chance to accumulate and clog the filter bags or cartridges, changing of these disposable filter devices is greatly reduced, thus reducing maintenance and down-time.

Diffusion plates or baffles, made from the same material as the chute itself, are arranged upright on the filter chute. The diffusion plates serve two very important functions. First, they increase the total uphill travel path so that the liquid is subject to a reverse gravitational pull for a longer period of time. Secondly, the plates effectively branch-off and divide the flow, creating bends much like a meandering stream. And like a stream where sediment accumulates at the bends, solids settle at the bends created by the diffusion plates. A center end plate is provided which abuts side end plates at the distal end of the chute. A cut-out portion on one lateral edge of the center end plate, when abutted to an adjacent side end plate creates an opening which cannot vary in size. This design prevents the operator from inadvertently changing the size of the opening. This final trio of diffusion end plates play an important role in the overall effectiveness of the filter chute. The final magnet placements are beneath the center end plate. As the liquid can only exit the chute through the slot (cut-out) created by the three plates positioned together, the liquid passes through this confined area directly over this last magnet. Ferrous sediment begins to build up, creating a hump or a dam over which the liquid must pass. This hump raises the level at which the liquid must be displaced to exit. This damming effect slows the flow, allowing more settling to occur in the chute. As the hump builds yet higher with sediment, the liquid level must again readjust, once again improving the settling taking place in the chute.

The filter chute rests on a stainless steel tray, which in turn sits upon a stainless steel table. These items are made from stainless steel for a number of reasons. Mainly, the magnetic force is to be directed upward through the chute only, which would not be the case if the table and tray were ferrous. Secondly, if the operator wants to remove the chute from the tray (to perhaps give the chute surface a more thorough cleaning after removing the sediment), he can do so easily because the magnets are not attracted to the tray beneath. Because of the strength of the magnets, it would be difficult to separate the two if they were both made from ferrous materials.

This stainless steel table has lockable, height-adjustable casters. When in operating position, the wheels lock into place so the flow is directed into the filter bag in the first tank. To clean the chute, the operator needs to remove the diffusion plates by lifting them free of the magnetic field. Then he unlocks the wheels, and positions the end of the chute over a receptacle into which he scrapes the sludge. After repositioning the diffusion plates, he rolls the chute back over the filter tank, locks the wheels in place, and the system is returned to service quickly and easily.

After passing over the filter chute, the liquid enters a 25 micron bag, suspended in a 45 gallon tank. This tank is unobstructed by baffle plates. Baffle plates within tanks encourage settling. To clean this type of tank, the liquid must first be pumped into another receptacle before the sediment can be removed. This results in more machine down-time and labor costs. The system of the invention encourages settling to occur only in the filter chute, from which sediment can be removed quickly and easily as previously described.

The liquid from the first tank is then gravity-fed by pipe to a second tank. When the liquid enters the second tank, the flow drops directly above the head of a submersible pump. This pump passes the liquid through a 5 micron filter bag at the rate of 300 gallons per hour.

The placement of the pump is important to the function of the system. If the pump was not under the direct flow, particles smaller than 25 microns could have the chance to settle in this second tank. But the flow and particles are picked up immediately by the pump and passed through the 5 micron bag. The bag is suspended from the top cover above the liquid level, and the overflow from this bag back into the solution below creates agitation. By creating agitation, settling is again discouraged. This overflow falls above the head of a second submersible pump. This second pump can be set at variable flow ratings depending on the processing needs. A speed of 10–30 gallons per hour would be an average range. This second pump picks up the overflow from the 5 micron bag and passes it through a final one micron filter cartridge. The solution has now been effectively cleaned, and it is reintroduced into the vibratory unit once again.

This cycle is repeated over and over as long as the machine is in use.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
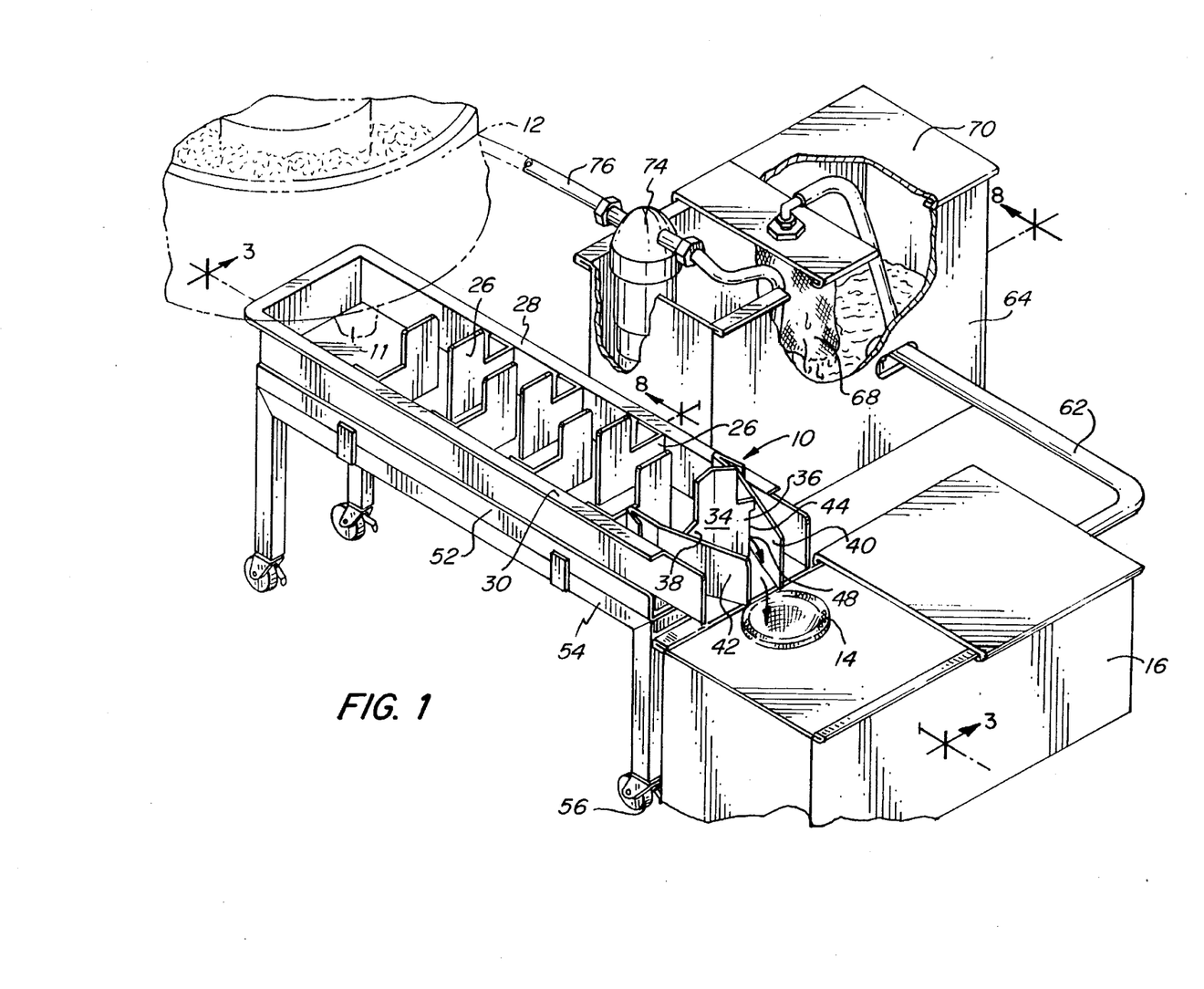
FIG. 1 is a perspective view of the apparatus used in the compound clarification system of the present invention.

Referring now to the drawings in detail, wherein like numerals indicate like elements throughout the several views, a generally rectangular filter chute 10 is situated below the exit drain 11 of a vibratory deburring machine 12, and leads the deburring compound discharged to a first filter bag 14 within a first tank 16. The main purpose of chute 10 is to collect as much as 80%–90% of the deburred solids in the deburring compound discharged from machine 12 before the compound reaches any of the disposable filters utilized in the system.

These solids are collected due in part to the incorporation of powerful ceramic magnets 18, located on the underside of the chute 10, to remove ground ferrous material from the deburring compound disposed in the chute.

These magnets 18 are approximately 1 inch thick by 4 inches wide and 6 inches long, and the number and pattern placements of the magnets vary according to the size of the deburring machine 12 and/or the deburring application. The magnets 18 are arranged on the underside surface 20 of the chute 10 and spaced as shown at 22 with non-magnetic materials, such as wood or aluminum partitions, in such a way as to maximize the polarity. Typical arrangements are indicated in FIGS. 9A to 9G, inclusive.

Three factors to determine which size chute 10 and which array of magnets 18 to utilize are:

1. The cubic foot capacity of the vibratory deburring unit to which the system is to be attached.
2. The flow rate per hour of the vibratory unit 12 to which the system is to be attached.
3. The type of deburring media being used in the subject vibratory deburring unit 12 as well as the type of metal being processed within the unit.

Various polarity and offset configurations which can be used are shown in FIGS. 9A to 9G.

Figure 3:
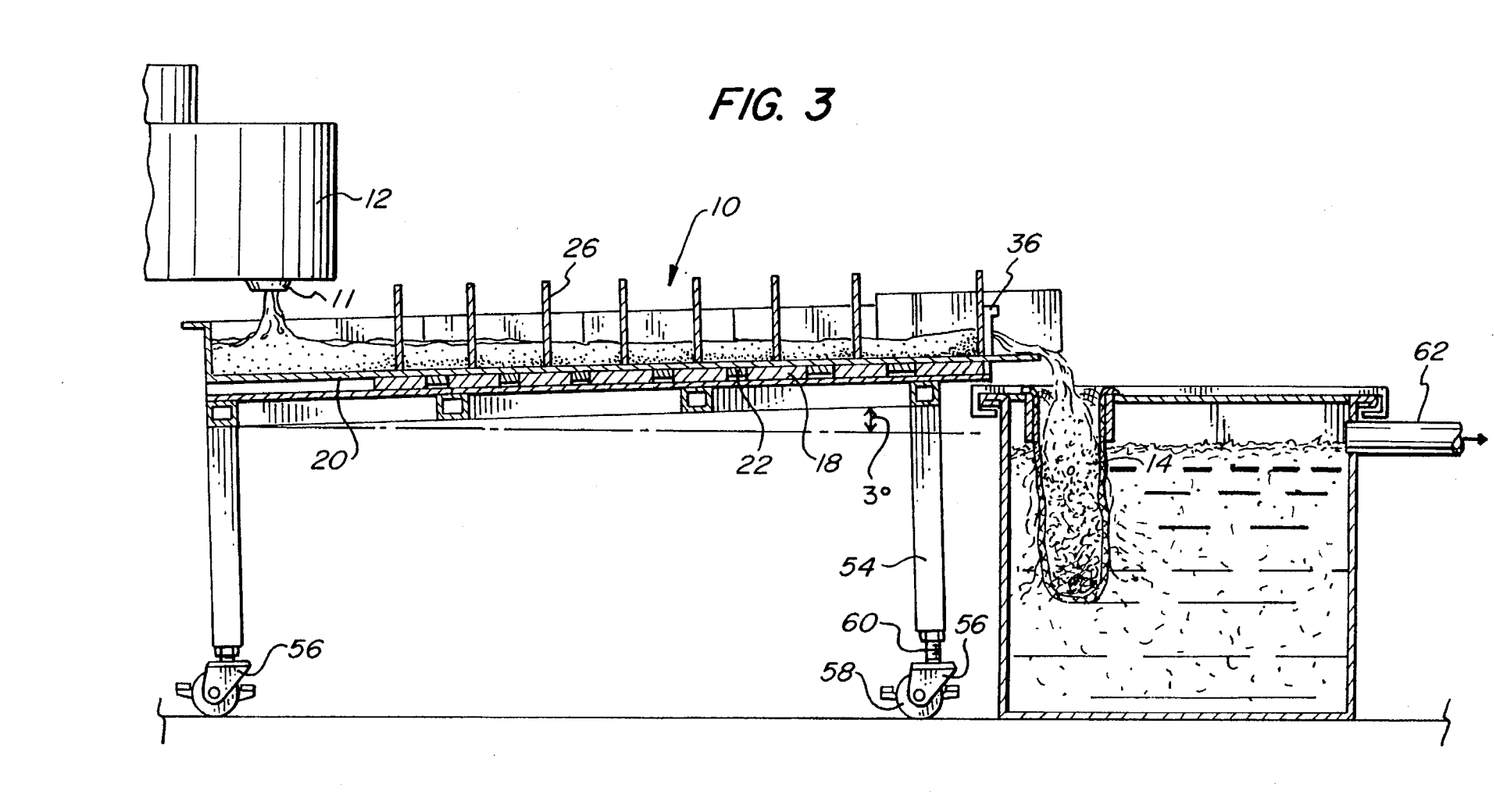
FIG. 3 is a cross-sectional view taken substantially along the plane indicated by line 3—3 of FIG. 1.

In each of the magnet arrangements depicted in FIGS. 9A–9G, there is an area 24 on the left end of each chute 10 which has no magnets. The drain from the machine 12 is above this area 24. Even though there are no magnets directly under the area 24, it is nonetheless magnetic, as the entire chute 10 is formed from ferrous material. The perimeters of the magnets 18 have the strongest pull, so the area 24 has magnetic sediment deposited thereon which begins to build higher at the perimeter of the first magnets 18 as the liquid discharge reaches it. This effect is enhanced by the fact that the chute 10 as depicted in FIG. 3 is at a three-degree uphill incline to the exit point.

Considerable settling of non-magnetic materials is also enhanced and occurs in the area 24. Settling also occurs in the center of each magnet 18 where a valley forms. This valley forms because the perimeters of the magnet are the most powerful area and the center is comparatively less powerful. So not only do the magnets play an active part in the collection of ferrous particles, but the manner in which the magnets are distributed along the chute contributes to the settling and collection of non-ferrous and non-metallic sediment as well.

Because of the size and power of the magnets 18 used, the whole chute 10 becomes saturated in its entirety by the magnetic force. It is this magnetic force field which attracts much of the ferrous material from the liquid discharge as it traverses the filter chute.

As indicated, the filter chute 10 is lower at the point where the deburring compound enters than it is where the compound exits. In other words, the flow is pushed uphill. The liquid is moved by displacement, and not by gravitational flow. The significance of this feature is that it greatly encourages settling of non-ferrous particles. Due to this settling feature, whereas the ferrous particles are removed by the magnetic force, non-ferrous particles (such as copper, brass or aluminum) and non-metallic particles (such as ground ceramic media), can and do accumulate in the filter chute 10. By gathering so much of the solids in this manner before they have a chance to accumulate and clog the filter bags or cartridges used in the system, changing of these disposable filter devices is greatly reduced, thus reducing maintenance and down-time.

Figure 4:
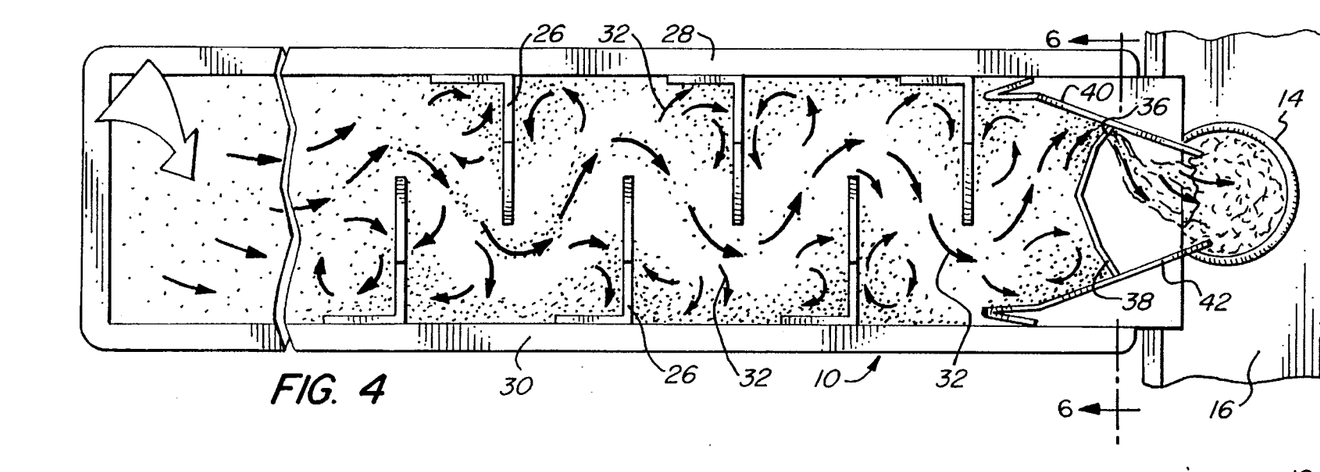
FIG. 4 is a partial, top plan view of the filter chute of the apparatus of FIG. 1.

L-shaped diffusion plates or baffles 26, made from the same material as the chute 10 itself, are arranged upright in staggered spaced relation on opposite sides 28, 30 of the filter chute 10. The diffusion plates 26 serve two very important functions. First, they increase the total uphill travel path so that the deburring compound is subject to gravitational pull for a longer period of time, enhancing the settling of non-ferrous solids. Further, the flow is slowed so it is subjected to the pull of magnets 18 for a longer period of time to increase the collection of ferrous materials. Secondly, the plates effectively branch-off and divide the flow of the compound, as indicated by the arrows 32 in FIG. 4, creating bends much like a meandering stream. And like a stream where sediment accumulates at the bends, solids settle at the bends created by the L-shaped diffusion plates 26.

The diffusion plates are held in place by the magnetic force of magnets 18, so they are easily removable, to aid in the cleaning and the removal of sludge from chute 10.

A center end plate 34 having lateral wings 36, 38 is provided which abuts side end plates 40, 42, respectively at the distal end of chute 10. Side end plates 40, 42 (and center end plate 34) are also held in place by the magnets 18 with the side plates angled towards each other. A cut-out portion 44 on one lateral edge 46 of the center end plate 34, when abutted to the adjacent side plate 40 creates an opening or slot 48 which cannot vary in size. This design prevents the operator from inadvertently changing the size of the opening.

Figure 5:
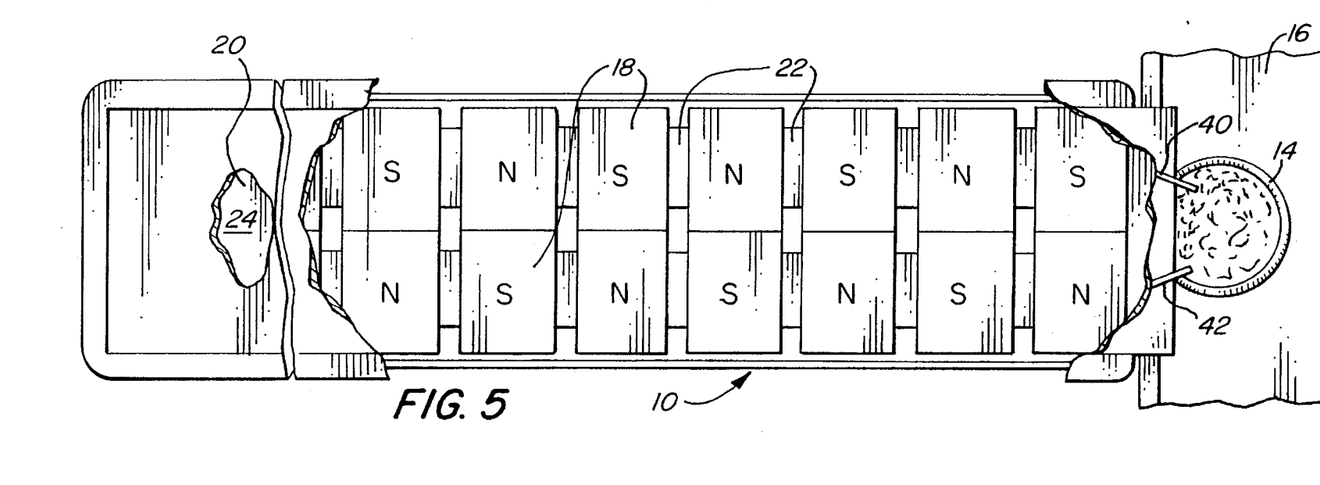
FIG. 5 is a partial, bottom plan view of the filter chute and support table of the apparatus of FIG. 1, with portions broken away for clarity.
Figure 6:
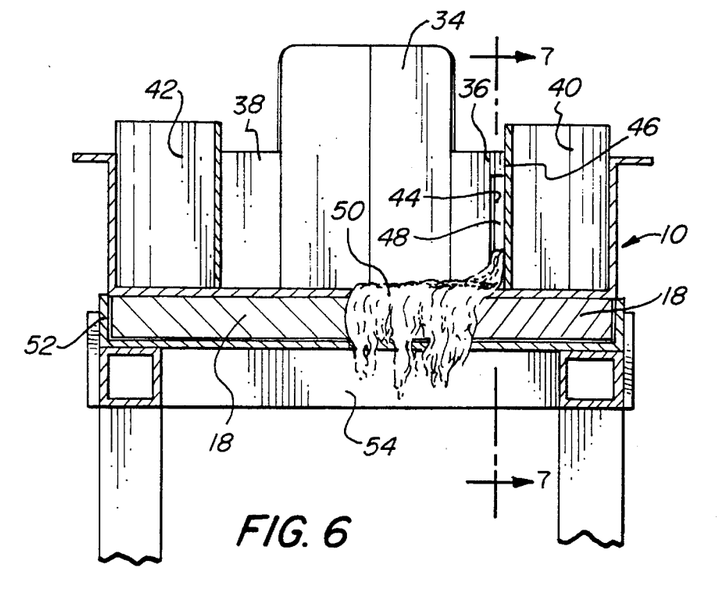
FIG. 6 is a cross-sectional view taken substantially along the plane indicated by line 6—6 of FIG. 4.
Figure 7:
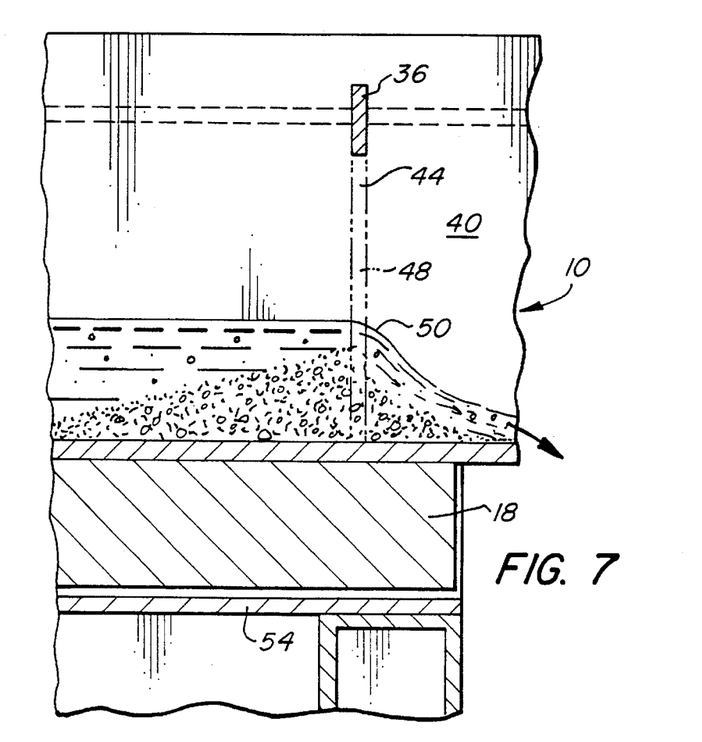
FIG. 7 is a cross-sectional view taken substantially along the plane indicated by line 7—7 of FIG. 6.

This final trio of diffusion end and side plates 34, 40, 42 play an important role in the overall effectiveness of the filter chute 10. The final magnet placements 18 are beneath the center end plate 34 (see e.g., FIG. 5). As the compound flow can only exit the chute 10 through the slot 48 created by the three plates 34, 40 and 42 positioned together, the flow passes through this confined area directly over this last magnet 18 (see FIGS. 6 and 7). Ferrous sediment begins to build up, creating a hump or a dam 50 over which the compound flow must pass. This hump or dam 50 raises the level at which the flow must be displaced to exit the chute 10. This damming effect slows the flow, allowing more settling to occur in the chute 10. As the hump builds yet higher with sediment, the flow level must again readjust, once again improving the settling taking place in the chute 10.

Figure 2:
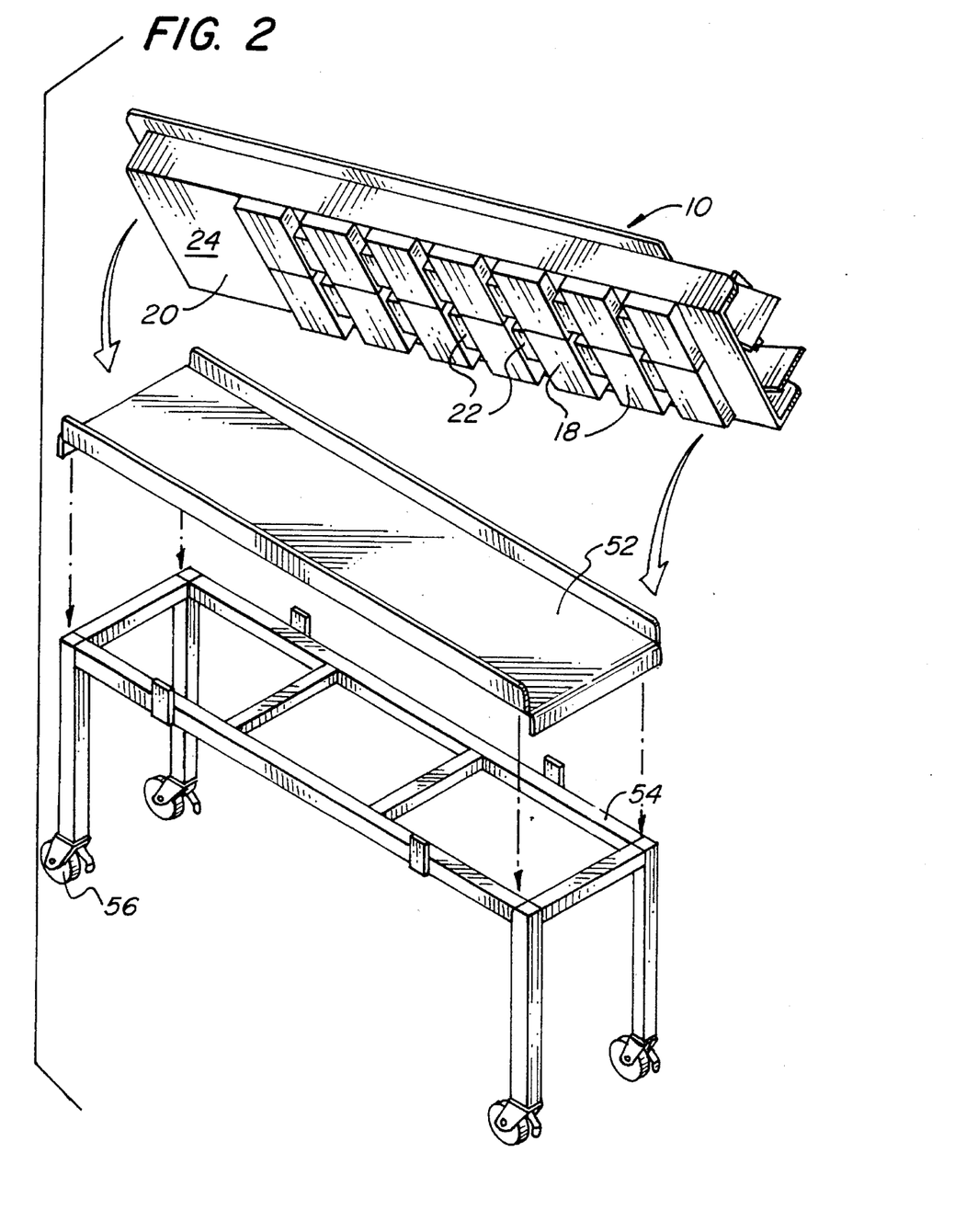
FIG. 2 is an exploded perspective view of the filter chute and support table of the apparatus of FIG. 1.

As illustrated in FIG. 2, the filter chute 10 rests on a stainless steel tray 52, which in turn sits upon a stainless steel table 54. These items are made from stainless steel for a number of reasons. Mainly, the magnetic force is to be directed upward through the chute 10 only, which would not be the case if the table and tray were ferrous. Secondly, if the operator wants to remove the chute 10 from the tray 52 (to perhaps give the chute surface a more thorough cleaning after removing the sediment), he can do so easily because the magnets are not attracted to the tray beneath. Because of the strength of the magnets, it would be difficult to separate the two if they were both made from ferrous materials.

This stainless steel table has lockable, height-adjustable casters 56. When in operating position, the wheels 58 of casters 56 lock into place (e.g. by a screw 60) so the deburring compound flow is directed into the filter bag 14 in the first tank 16. To clean the chute 10, the operator only needs to remove the diffusion plates 26 by lifting them free of the magnetic field. Then he unlocks the wheels 56, and positions the end of the chute 10 over a receptacle into which he scrapes the sludge. After repositioning the diffusion plates 26, he rolls the chute 10 back over the filter tank 16, locks the wheels 56 in place, and the system is returned to service quickly and easily.

After passing over the filter chute 10, the compound enters e.g., a 25 micron filter bag 14, suspended in a 45 gallon tank 16. This tank 16 is unobstructed by baffle plates. Baffle plates within tanks encourage settling. To clean this type of tank, the compound must first be pumped into another receptacle before the sediment can be removed. This results in more machine down-time and labor costs. The system of the invention encourages settling to occur only in the filter chute 10, from which sediment can be removed quickly and easily as previously described.

The filtered flow from the first tank 16 is then gravity-fed by a pipe 62 to a second tank 64. When the flow enters the second tank 64, the flow drops directly above the head of a submersible pump 66 (see FIG. 8). This pump 66 passes the liquid through e.g., a 5 micron filter bag 68 at the rate of 300 gallons per hour.

Figure 8:
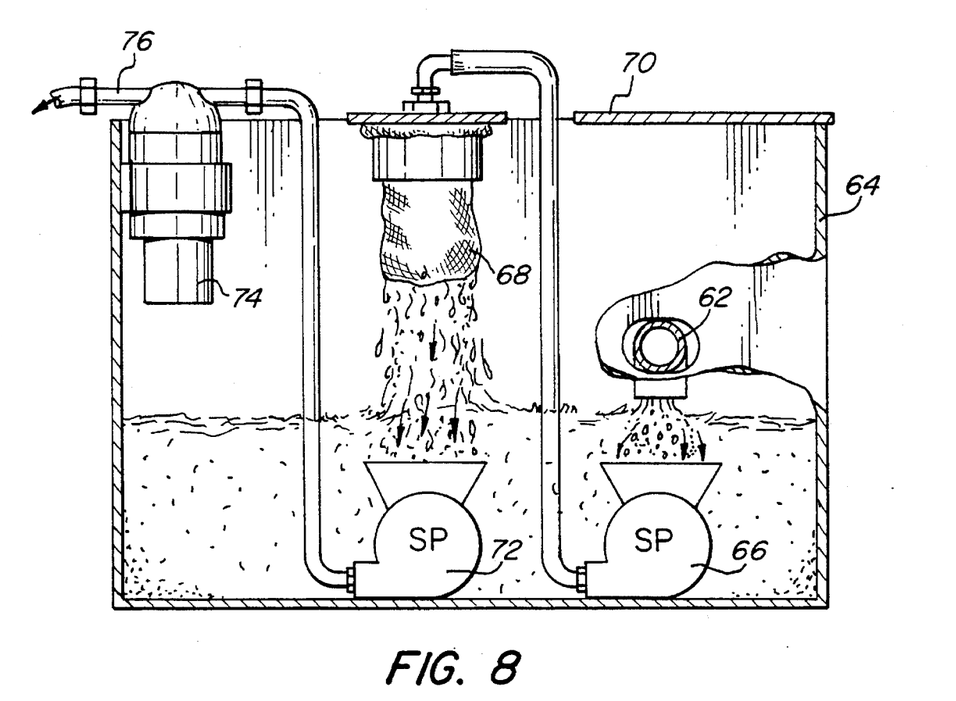
FIG. 8 is a cross-sectional view taken substantially along the plane indicated by line 8—8 of FIG. 1.
Figure 9A:
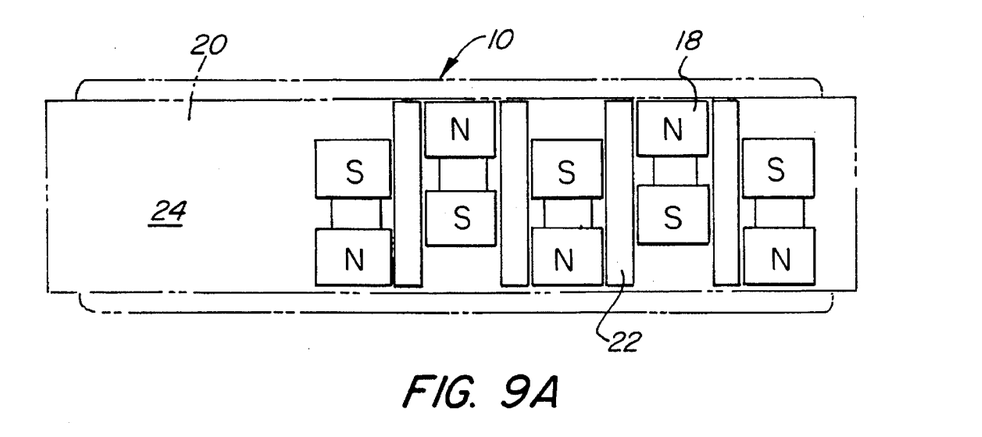
FIGS. 9A–9G inclusive are bottom views of the filter chute of FIG. 5, illustrating different configurations of magnets on the bottom of the chute to enhance filtering capabilities of the chute.
Figure 9B:
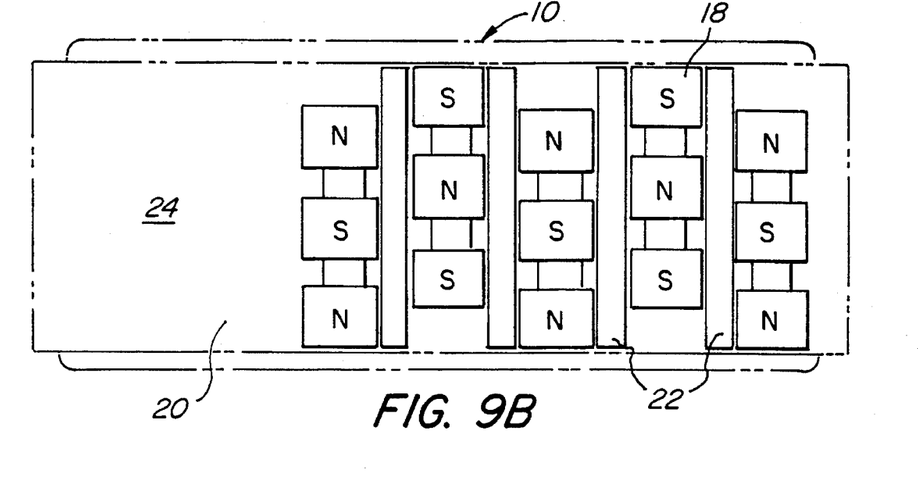
Figure 9C:
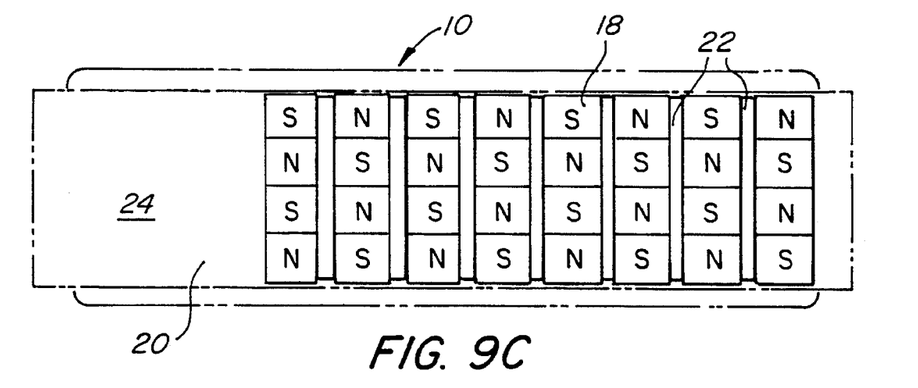
Figure 9D:
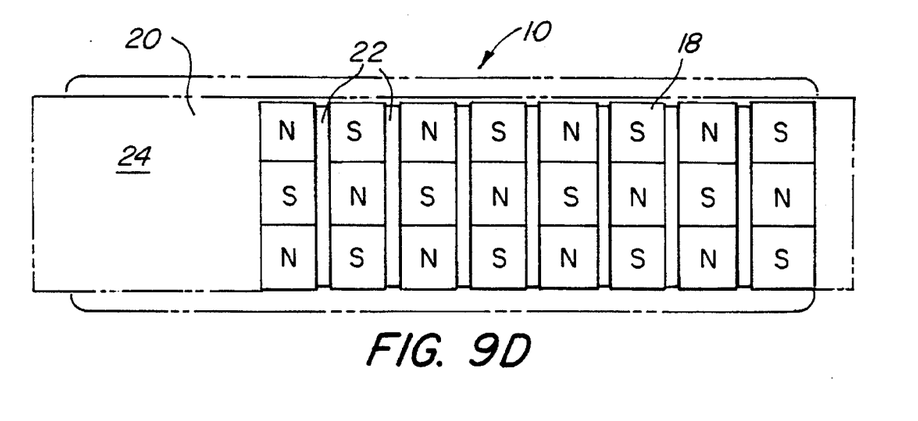
Figure 9E:
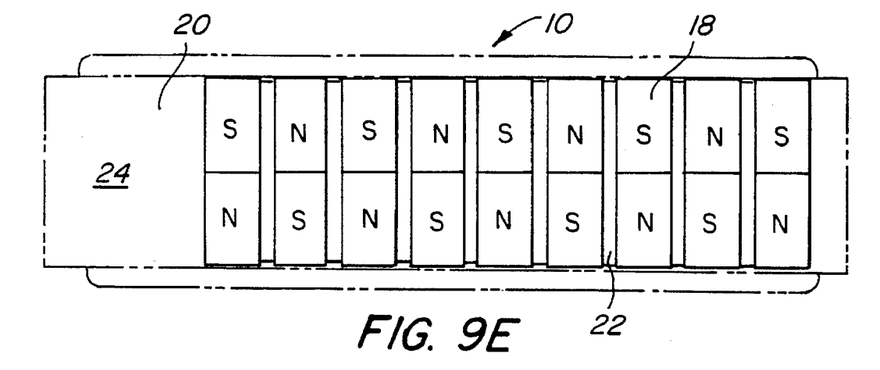
Figure 9F:
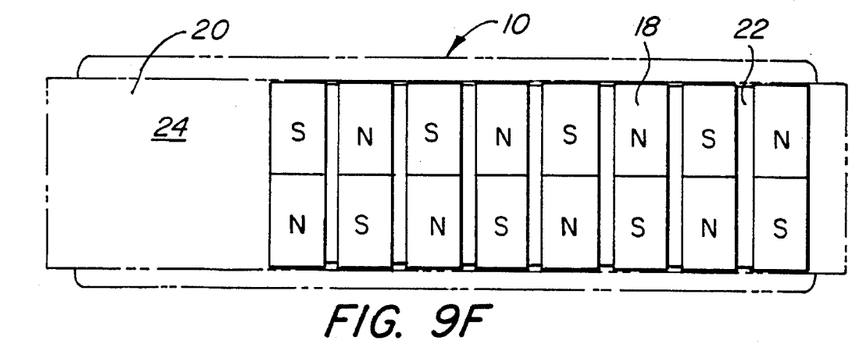
Figure 9G:
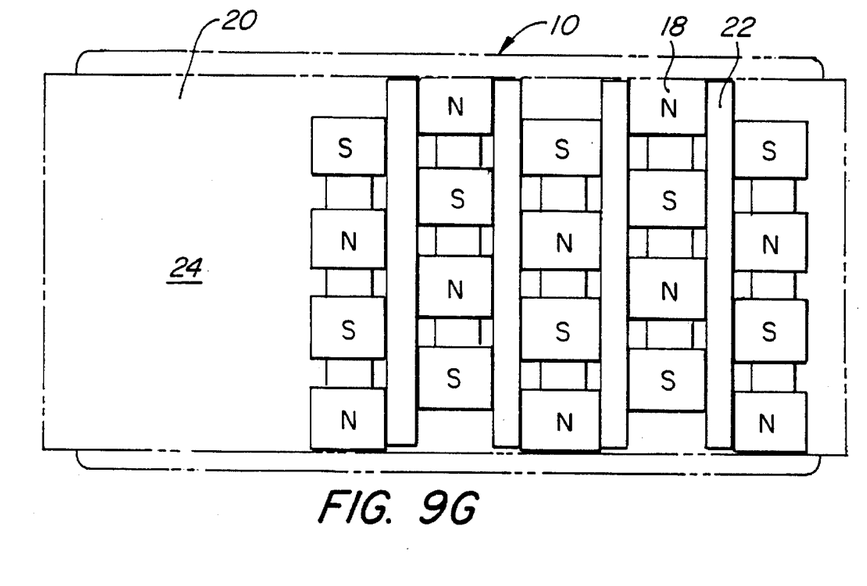

The placement of the pump 66 is important to the function of the system. If the pump 66 was not under the direct flow, particles smaller than 25 microns could have the chance to settle in the second tank 64. But the flow and particles are picked up immediately by the pump and passed through the 5 micron bag 68. The bag 68 is suspended from the top cover 70 above the liquid level, and the overflow from this bag back into the solution below creates agitation. By creating agitation, settling is again discouraged. This overflow falls above the head of a second submersible pump 72. This second pump 72 can be set at variable flow ratings depending on the processing needs. A speed of 10–30 gallons per hour would be an average range. This second pump 72 picks up the overflow from the 5 micron bag 68 and passes it through e.g., a final one micron filter cartridge 74. The compound flow has now been effectively cleaned, and it is reintroduced into the vibratory unit 12 once again through a pipe 76.

This cycle is repeated over and over as long as the machine is in use.

I claim:

1. A compound clarification system including an apparatus for cleaning and recycling a fluid deburring compound containing contaminant solids comprising:

filter chute means for transporting fluid deburring compound received from a metal deburring apparatus to a further filtering apparatus, said filter chute means including a bottom wall defining an upper surface and a lower surface, a pair of opposed sidewalls extending upwardly from opposed sides of said bottom wall, an inlet end, and an outlet end;

table means for supporting said filter chute means, said table means including leg means defining free ends which terminate in a horizontal reference plane, wherein said table means is configured and arranged to support said filter chute means such that said bottom wall has a positive angle of inclination with respect to said horizontal reference plane and such that said outlet end is elevated with respect to said inlet end;

a plurality of spaced baffle plates, said baffle plates being positioned on the upper surface of said bottom wall and on alternate ones of said opposed sidewalls and extending inwardly toward the respective other one of said opposed sidewalls to provide a positively inclined tortuous path for said fluid, resulting in solids in said fluid settling upon the upper surface of the bottom wall of said chute means;

a plurality of magnets disposed adjacent the lower surface of said bottom wall of said filter chute means arranged to providing a magnetic field covering said chute means to separate ferrous solids from said fluid which are subsequently collected on the upper surface of the bottom wall of said chute means;

a further filtering apparatus including filter bag purification means disposed adjacent said outlet end of said filter chute means for removing any remaining solids in said fluid; and means connected to said further filtering apparatus for returning filtered fluid to said deburring apparatus.

2. The system of claim 1 wherein the upper surface of said bottom wall of said filter chute means is planar and said baffle plates protrude from said opposed side walls in a staggered array.

3. The system of claim 2 wherein said means for supporting said filter chute means includes a tray for receiving said filter chute means and said magnet thereon.

4. The system of claim 3, wherein said table includes adjustable height casters attached to the free ends of said leg means.

5. The system of claim 1 wherein said filter bag purification means includes a first filter bag for filtering a first size of said solids from said deburring fluid compound, and a second filter bag for filtering a second size of said solids smaller than said first size from said deburring fluid compound, and first means for transporting fluid filtered by said first filter bag to said second filter bag.

6. The system of claim 5 wherein said further filtering apparatus includes a filter cartridge for removing a third size of said solids smaller than said second size from said deburring fluid compound, and second means for transporting fluid filtered by said second filter bag to said filter cartridge.

7. The system of claim 5 wherein said first means for transporting includes conduit means connected to a tank, and a submersible pump disposed in said tank and having an intake located below an outlet end of said conduit means.

8. The system of claim 7 wherein said pump has an outlet means fluidly connected to an inlet side of said second filter bag.

9. The system of claim 8 wherein said further filtering apparatus includes a filter cartridge for removing a third size of said solids smaller than said second size from said deburring compound, second means for transporting fluid filtered by said second filter bag to said filter cartridge, said filter cartridge communicating with said means for returning said deburring fluid to said deburring apparatus.

10. The system of claim 1 wherein said baffle plates are made from a ferrous material and are secured to the upper surface of said bottom wall by said magnets.

11. The system of claim 1 wherein one of said baffle plates is positioned adjacent said outlet end and extends across said chute means between the sidewalls thereof and has a fixed height slot formed therein to accommodate the passage of said fluid deburring fluid compound therethrough.

\* \* \* \* \*